W. J. HISS.
CONDUIT OR CABLE CLAMP AND BRIDLE RING.
APPLICATION FILED OCT. 27, 1920.
1,410,011.   Patented Mar. 21, 1922.
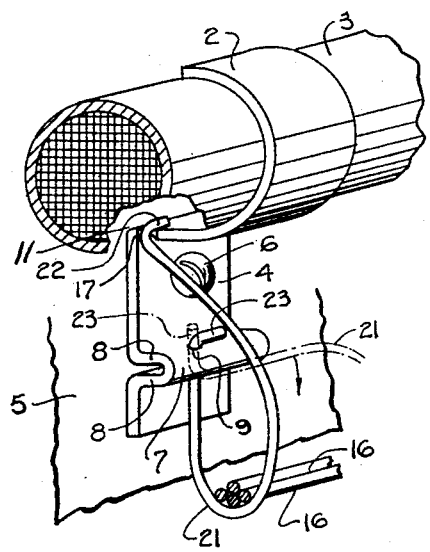
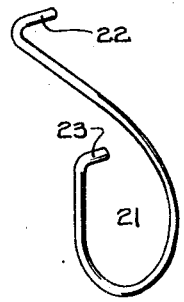
INVENTOR
William J. Hiss
BY
Ala M Johnson
ATTORNEY

UNITED STATES PATENT OFFICE.

WILLIAM J. HISS, OF NEW YORK, N. Y., ASSIGNOR TO DIAMOND EXPANSION BOLT COMPANY, OF NEW YORK, N. Y., A CORPORATION OF NEW YORK.

CONDUIT OR CABLE CLAMP AND BRIDLE RING.

1,410,011.  Specification of Letters Patent.  Patented Mar. 21, 1922.

Application filed October 27, 1920. Serial No. 419,924.

*To all whom it may concern:*

Be it known that I, WILLIAM J. HISS, a citizen of the United States, residing in the borough of Manhattan, in the city, county, and State of New York, have invented certain new and useful Improvements in Conduit or Cable Clamps and Bridle Rings, of which the following is a specification taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp formed of pressed sheet metal having the base crimped or bent back upon itself to form a hump, the different arms of the hump being provided with aligned holes through which a bridle ring may be threaded.

My invention further relates to such a conduit or cable clamp and bridle ring in which the bridle ring after being threaded through the hump, has one of its hooks supported by the hump while the other hook of the bridle ring hooks into the dead space of the conduit clamp.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claim.

The same reference numerals refer to similar parts in the several figures.

Fig. 1 is a perspective view of my combined conduit and cable clamp and bridle ring;

Fig. 2 is a perspective detail view of my bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with the hook portion 2 to support a conduit or cable 3, and a base 4 to lie against a wall or other suitable support 5. The clamp is held in position by the securing screw 6.

To reduce the cost of manufacture of the conduit or cable clamp I make it out of metal of the minimum thickness. To strengthen the base 4 I provide it with a bend or crimp forming a hump 7, intermediate its ends, having sides 8, 8. These sides are provided with aligned holes 9, 9 for the reception of a bridle ring 21, Fig. 2, which can be threaded through the openings in the hump 7.

When the cable or conduit 3 is first installed the bridle ring, as a member, is not employed. The cable or conduit being circular in cross section and held against the wall 5, there is a triangular space 11 which is not filled by the cable or conduit. For purpose of description, I have termed this a "dead space," for the reason that it is not occupied by the cable.

Weeks, months or years after the original installation, should the traffic load upon the cable 3 become excessive and the telephone or telegraph engineers desire to increase the capacity of the installation without going to the expense of taking down this cable and installing a larger one, the increased traffic load can be carried by simply threading my bridle ring through the aligned holes 9, 9 in the hump 7 and attaching the ends of the bridle ring to the conduit or cable clamp.

I preferably, though not necessarily, provide the conduit or cable clamp with a cutaway portion or notch 17 adjacent to the meeting surfaces of the hook portion 2 and the base 4, as shown in Fig. 1. The sides of this notch tend to prevent lateral movement of the hook on the end of the bridle ring 21.

My bridle ring 21, Fig. 2, is provided with the hooks 22 and 23. It is attached to the conduit or cable clamp shown in Fig. 1, by first threading the hook 23 vertically through the aligned holes 9, 9 in the hump 7 as shown in dotted lines in Fig. 1. The bridle ring is then swung down from the doted position some 90° and the hook 22 is hooked into the dead space 11. In this form of my invention the hook 23 remains in contact with the upper surface of the crimp or hump 7.

Having thus described this invention in connection with an illustrative embodiment thereof, to the details of which I do not desire to be limited, what is claimed as new and what is desired to secure by Letters Patent is set forth in the appended claim.

What I claim is:—

The combination of a conduit or cable clamp having a hook portion to support a conduit or cable and base to lie against a wall or other suitable support, the base being bent or crimped to form a hump and provided with aligned holes to permit a bridle ring to be threaded through said holes, and a bridle ring passing through said aligned holes in the crimp or hump and having two hooks one of which is adapted to hook into the dead space on the conduit or cable clamp and the other hook is adapted to engage and be held by the crimp or hump on the base.

WILLIAM J. HISS.

Witnesses:
M. R. RYAN,
A. M. WILLIAMS.